US006929679B2

(12) United States Patent
Müller et al.

(10) Patent No.: US 6,929,679 B2
(45) Date of Patent: Aug. 16, 2005

(54) METHOD OF STORING, UPTAKING, RELEASING OF GASES BY NOVEL FRAMEWORK MATERIALS

(75) Inventors: Ulrich Müller, Neustadt (DE); Klaus Harth, Altleiningen (DE); Markus Hölzle, Kirchheim (DE); Michael Hesse, Worms (DE); Lisa Lobree, Mannheim (DE); Wolfgang Harder, Weinheim (DE); Omar M. Yaghi, Ann Arbor, MI (US); Mohamed Eddaoudi, Ann Arbor, MI (US)

(73) Assignees: BASF Aktiengesellschaft, Ludwigshafen (DE); The Regents of the University of Michigan, Ann Arbor, MI (US)

(*) Notice: Subject to any disclaimer, the term of this patent is extended or adjusted under 35 U.S.C. 154(b) by 487 days.

(21) Appl. No.: 10/061,147

(22) Filed: Feb. 1, 2002

(65) Prior Publication Data

US 2003/0148165 A1 Aug. 7, 2003

(51) Int. Cl.$^7$ .......................... H01M 8/04; F17C 11/00; B01D 53/02
(52) U.S. Cl. .............................. 95/90; 96/108; 206/0.7; 429/34; 502/526
(58) Field of Search .................... 95/90, 116; 96/108; 206/0.7; 429/12, 34; 502/526; 556/1

(56) References Cited

U.S. PATENT DOCUMENTS

| | | | | |
|---|---|---|---|---|
| 4,440,871 | A | * | 4/1984 | Lok et al. .................... 502/214 |
| 5,648,508 | A | | 7/1997 | Yaghi |
| 6,617,467 | B1 | | 9/2003 | Mueller et al. |
| 6,624,318 | B1 | | 9/2003 | Mueller et al. |
| 6,634,321 | B2 | * | 10/2003 | Hussain et al. ................. 123/3 |
| 2002/0096048 | A1 | * | 7/2002 | Cooper et al. ................. 95/116 |
| 2004/0225134 | A1 | * | 11/2004 | Yaghi et al. |

FOREIGN PATENT DOCUMENTS

| | | | |
|---|---|---|---|
| EP | 0 727 608 | | 8/1996 |
| EP | 0 790 253 | | 8/1997 |
| JP | 09-227572 A | * | 9/1997 |

OTHER PUBLICATIONS

S. Hynek, et al., Int. J. Hydrogen Energy, vol. 22, No. 6, pp. 601–610, "Hydrogen Storage by Carbon Sorption", 1997.
J. A. Kerres, Journal of Membrane Science, vol. 185, pp. 3–27, "Development of Ionomer Membranes for Fuel Cells", 2001.
N. Stath, et al., Materialstoday, vol. 4, pp. 20–24, "Optoelectronic Device Substrates", Jul./Aug. 2001.
R. T. Yang, Carbon, vol. 38, pp. 623–641, "Hydrogen Storage By Alkali–Doped Carbon Nanotubes–Revisited", 2000.
C. Liu, et al., Science, vol. 286, pp. 1127–1129, "Hydrogen Storage in Single–Walled Carbon Nanotubes at Room Temperature", Nov. 5, 1999.
R. Dagani, Chemical & Engineering News, vol. 80, No. 3, pp. 1–3, "Crystal Sponges", Jan. 21, 2002.
B. Chen, et al., Science, vol. 291, pp. 1021–1023, "Interwoven Metal–Organic Framework on a Periodic Minimal Surface With Extra–Large Pores", Feb. 9, 2001.
M. Eddaoudi, et al., Topics in Catalysis, vol. 9, pp. 105–111, "Design and Synthesis of Metal–Carboxylate Frameworks With Permanent Microporosity", 1999.
H. Li, et al., Nature, vol. 402, pp. 276–279, "Design and Synthesis of an Exceptionally Stable and Highly Porous Metal–Organic Framework", Nov. 18, 1999.
M. O'Keeffe, et al., Journal of Solid State Chemistry, vol. 152, pp. 3–20, "Frameworks for Extended Solids: Geometrical Design Principles", 2000.
J. Kim, et al., J. Am. Chem. Soc., vol. 123, pp. 8239–8247, "Assembly of Metal–Organic Frameworks From Large Organic and Inorganic Secondary Building Units: New Examples and Sumplifying Principles for Complex Structures", 2001.
M. Eddaoudi, et al., Science, vol. 295, pp. 469–472, "Systematic Design of Pore Size and Functionality in Isoreticular MOFs and Their Application in Methane Storage", Jan. 18, 2002.
M. Eddaoudi, et al., Accounts of Chemical Research, vol. 34, No. 4, pp. 319–330, "Modular Chemistry: Secondary Building Units as a Basis for the Design of Highly Porous and Robust Metal–Organic Carboxylate Frameworks", 2001.

* cited by examiner

Primary Examiner—Frank M. Lawrence
(74) Attorney, Agent, or Firm—Oblon, Spivak, McClelland, Maier & Neustadt, P.C.

(57) ABSTRACT

The present invention relates to the technical field of storing gas including methane and hydrogen, in particular to the fuel cell technology. In particulars it relates to a method of using a metallo-organic framework material comprising pores and at least one metal ion and at least one at least bidentate organic compound.

15 Claims, 3 Drawing Sheets

METHOD OF STORING, UPTAKING, RELEASING OF GASES BY NOVEL FRAMEWORK MATERIALS

The present invention relates to the technical field of storing gas including methane and hydrogen, in particular to the fuel cell technology. In particular, it relates to a method of using a metallo-organic framework material comprising pores and at least one metal ion and at least one at least bidentate organic compound, which is bound, preferably coordinately bound to said metal ion for uptaking, or storing, or releasing, or uptaking and storing, or uptaking and releasing, or storing and releasing or uptaking, storing and releasing at least one gas and an apparatus comprising the material defined above.

Fuel cell technology is regarded as one of the core technologies of the 21$^{st}$ century, e.g. in relation to stationary applications, such as power plants, mobile applications such as cars, busses and trucks and portable applications, such as cellular phones and laptops and in so called APUs, such as the power supply in power plants. The reason therefor lies in the increased efficiency of fuel cells compared to normal combustion engines. Furthermore, the fuel cell produces significantly less emissions. An overview of the current developments in fuel cell technology may be found in Hynek et al. "Int. J. Hydrogen Energy", 22, no. 6, pp. 601–610 (1997), J. A. Kerres "Journal of Membrane Science", 185, 2001, p. 3–27 and a further review article by G. March in "Materials Today", 4, No.2 (2001), p. 20–24.

The use of metallo-organic complexe for storing gaseous C1 to C4 carbohydrates is disclosed in EP-A 0 727 608. However, the complexes disclosed therein are difficult to synthesize. Furthermore, their storing capacity is low, if not too low to be industrially applicable.

Another attempt to provide materials useful for storing gases is the use of alkali-doped or undoped carbon nanotubes. An overview of the present status of research regarding this approach may be found in Yang, "Carbon" 38 (2000), pp. 623–641 and Cheng et al. "Science" 286, pp. 1127–1129.

In view of the above recited prior art, an object of the invention is to be seen in the provision of new materials which are particularly useful for storing and/or retaining and/or releasing gases.

This object is solved by and the present invention relates to a method for uptaking, or storing, or releasing, or uptaking and storing, or uptaking and releasing, or storing and releasing or uptaking, storing and releasing at least one gas characterized in that the gas is uptaken, or stored, or released, or uptaken and stored, or uptaken and released, or stored and released or uptaken, stored and released by an agent comprising a metallo-organic framework material comprising pores and at least one metal ion and at least one at least bidentate organic compound, which is bound, preferably coordinately bound to said metal ion.

The present invention further relates to a device for uptaking, or storing, or releasing, or uptaking and storing, or uptaking and releasing, or storing and releasing, or uptaking, storing and releasing at least one gas, preferably a fuel cell, accommodating a metallo-organic framework material, as defined herein.

The present invention still further relates to a method of using an agent comprising a metallo-organic framework material comprising pores and at least one metal ion and at least one at least bidentate organic compound, which is bound, preferably coordinately bound to said metal ion for uptaking, or storing, or releasing, or uptaking and storing, or uptaking and releasing, or storing and releasing or uptaking, storing and releasing at least one gas in stationary, mobile and mobile portable applications, preferably in power plants, cars, trucks, busses, cell phones, laptops.

It further relates to the use of the device described herein for supplying power to power plants, cars, trucks, busses, cell phones, laptops.

The metallo-organic pore containing framework material, which in turn comprises a metal ion and an at least bidentate organic compound, said bidentate organic compound being bound, preferably coordinately bound to the metal ion. Such materials are known as such and described in e.g. U.S. Pat. No. 5,648,508, EP-A-0 709 253, J. Sol. State Chem., 152 (2000) p. 3–20, Nature 402 (1999), p. 276 seq., Topics in Catalysis 9 (1999), p. 105–111, Science 291 (2001), p. 1021–23. An inexpensive way for their preparation is the subject of DE 10111230.0. The content of the above-mentioned literature, to which reference is made herein, is fully incorporated in the content of the present application.

The metallo-organic framework materials, as used in the present invention, comprise pores, particularly micro- and/or mesopores, wherein micropores are defined as being pores having a diameter of 2 nm or below and mesopores being pores having a diameter in the range of above 2 nm to 50 nm, respectively, according to the definition in Pure Applied Chem. 45, p. 71 seq., particularly p. 79 (1976). The presence of the micro- and/or mesopores may be monitored by sorption measurements for determining the capacity of the metallo-organic framework materials to take up nitrogen at 77 K according to DIN 66131, 66134. A type-I-form of the isothermal curve indicates the presence of micropores. In a preferred embodiment, the specific surface areas, as calculated according to the Langmuir model are preferably above 5 m$^2$/g, more preferable above 20 m$^2$/g, even more preferably above 50 m$^2$/g, particularly above 500 m$^2$/g and may increase into the region of to above 2000 m$^2$/g.

As the metal component within the framework material as used according to the present invention, particularly to be mentioned are metal ions of elements of groups Ia, IIa, IIIa, IVa to VIIIa and Ib to VIb of the periodic system; among those particularly to be mentioned are Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably Zn, Cu, Ni, Pd, Pt, Ru, Rh and Co. As metal ions of these elements, particularly to be mentioned are: Mg$^{2+}$, Ca$^{2+}$, Sr$^{2+}$, Ba$^{2+}$, Sc$^{3+}$, Y$^{3+}$, Ti$^{4+}$, Zr$^{4+}$, Hf$^{4+}$, V$^{4+}$, V$^{3+}$, V$^{2+}$, Nb$^{3+}$, Ta$^{3+}$, Cr$^{3+}$, Mo$^{3+}$, W$^{3+}$, Mn$^{3+}$, Mn$^{3+}$, Mn$^{2+}$, Re$^{3+}$, Re$^{2+}$, Fe$^{3+}$, Fe$^{2+}$, Ru$^{3+}$, Ru$^{2+}$, Os$^{3+}$, Os$^{2+}$, Co$^{3+}$, Co$^{2+}$, Rh$^{2+}$, Rh$^{+}$, Ir$^{2+}$, Ir$^{+}$, Ni$^{2+}$, Ni$^{+}$, Pd$^{2+}$, Pd$^{+}$, Pt$^{2+}$, Pt$^{+}$, Cu$^{2+}$, Cu$^{+}$, Ag$^{+}$, Au$^{+}$, Zn$^{2+}$, Cd$^{2+}$, Hg$^{2-}$, Al$^{3+}$, Ga$^{3+}$, In$^{3+}$, Tl$^{3+}$, Si$^{4+}$, Si$^{2+}$, Ge$^{4+}$, Ge$^{2+}$, Sn$^{4+}$, Sn$^{2+}$, Pb$^{4+}$, Pb$^{2+}$, As$^{5+}$, As$^{3+}$, As$^{+}$, Sb$^{3+}$, Sb$^{+}$, and Bi$^{5+}$, Bi$^{3+}$, Bi$^{+}$.

With regard to the preferred metal ions and further details regarding the same, particular references is made to: U.S. Pat. No. 5,648,508, particularly to col. 11, lines 10ff, section "The Metal Ions" which section is incorporated herein by reference.

As the at least bidentate organic compound, which is capable to coordinate with the metal ion, in principle all compounds which are suitable for this purpose and which fulfill the above requirements of being at least bidentate, may be used. The organic compound must have at least two centers, which are capable to coordinate with the metal ions of a metal salt, particularly with the metals of the aforementioned groups. With regard to the at least bidentate organic compound, specific mention is to be made of compounds having i) an alkyl group substructure, having from 1 to 10 carbon atoms,
ii) an aryl group substructure, having from 1 to 5 phenyl rings,
iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, aromatic, at least one hetero atom comprising aromatic di-, tri- and tetracarboxylic acids, which have one or more nuclei.

A preferred ligand is terephthalic acid, particularly preferred metal ions are $Co^{2+}$ and $Zn^{2+}$.

Besides the at least bidentate organic compound, the framework material as used in accordance with the present invention may also comprise one or more mono-dentate ligands, which are preferably derived from the following mono-dentate substances:

a. alkyl amines and their corresponding alkyl ammonium salts, containing linear, branched, or cyclic aliphatic groups, having from 1 to 20 carbon atoms (and their corresponding ammonium salts);
b. aryl amines and their corresponding aryl ammonium salts having from 1 to 5 phenyl rings;
c. alkyl phosphonium salts, containing linear, branched, or cyclic aliphatic groups, having from 1 to 20 carbon atoms;
d. aryl phosphonium salts, having from 1 to 5 phenyl rings;
e. alkyl organic acids and the corresponding alkyl organic anions (and salts) containing linear, branched, or cyclic aliphatic groups, having from 1 to 20 carbon atoms;
f. aryl organic acids and their corresponding aryl organic anions and salts, having from 1 to 5 phenyl rings;
g. aliphatic alcohols, containing linear, branched, or cyclic aliphatic groups, having from 1 to 20 carbon atoms;
h. aryl alcohols having from 1 to 5 phenyl rings;
i. inorganic anions from the group consisting of:
   sulfate, nitrate, nitrite, sulfite, bisulfite, phosphate, hydrogen phosphate, dihydrogen phosphate, diphosphate, triphosphate, phosphate, phosphite, chloride, chlorate, bromide, bromate, iodide, iodate, carbonate, bicarbonate, and the corresponding acids and salts of the aforementioned inorganic anions,
j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ehtanolamine, triethylamine and trifluoromethylsulfonic acid.

Further details regarding the at least bidentate organic compounds and the mono-dentate substances, from which the ligands of the framework material as used in the present application are derived, may be deduced from U.S. Pat. No. 5,648,508, whose respective content is incorporated into the present application by reference.

Particularly preferred are within the present application framework materials of the kind described herein, which comprise $Zn^{2+}$ as a metal ion and ligands derived from terephthalic acid as the bidentate compound, which are known as MOF-5 in the literature.

Further metal ions and at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE 10111230.0.

As solvents, which are particularly useful for the preparation of MOF-5,in addition to the solvents disclosed in the above-referenced literature dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The separation of the framework materials, particularly of MOF-5, from the mother liquor of the crystallization may be achieved by procedures known in the art such as solid-liquid separations, such as centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, spray-drying or spray granulation as well as by evaporation of the mother liquor at elevated temperature and/or in vacuo and concentrating of the solid.

The separated framework materials, particularly MOF-5, may be compounded, melted, extruded, co-extruded, pressed, spinned, foamed and granulated according to processes known within the processing of plastics, respectively. Generally the materials are used in the form of pellets or in film or sheet-like form for the purpose of this invention. However, the above methods allow to prepare various further and different geometries and shapes, which are necessary for the widespread application areas of said materials according to the present invention, particularly when used in mobile and mobile portable applications.

As the gases to be retained and/or stored and/or released, particularly to be mentioned are hydrocarbons, alcohols, hydrogen, nitrogen, noble gases, CO, $CO_2$, natural gases, synthesis gas, compounds generating and/or delivering these gases and mixtures of two or more thereof. Particularly preferred are hydrogen, a hydrogen containing gas mixture, a hydrogen generating or delivering substance, a gas mixture comprising at least one hydrogen generating and/or delivering substance.

In a further embodiment the metallo-organic framework material is contacted with at least one capacity-enhancing agent selected from the group consisting of: solvents, complexes, metals, metal hydrides, alloys, and mixtures of two or more thereof, such as embodiments of the above derived from Pd, Pt, Ni, and Ru as the metal.

Furthermore, the present invention relates to a device for uptaking, or storing, or releasing, or uptaking and storing, or uptaking and releasing, or storing and releasing, or uptaking, storing and releasing at least one gas, accommodating a metallo-organic framework material, as defined herein.

Said device may include the following further components:
   a container accommodating the metallo-organic framework material;
   an entrance/exit opening for allowing the at least one gas to enter or exit the device;

a gas-tight maintaining mechanism capable of maintaining the gas under pressure inside the container.

The invention further relates to a fuel cell accommodating the agent as described herein.

It also relates to a method of using an agent comprising the metallo-organic framework material described herein for uptaking, or storing, or releasing, or uptaking and storing, or uptaking and releasing, or storing and releasing or uptaking, storing and releasing at least one gas in stationary, mobile and mobile portable applications, preferably in power plants, cars, trucks, busses, cell phones, laptops, and a method of using the device according to the present invention for supplying power to power plants, cars, trucks, busses, cell phones, laptops.

Method of using the fuel cell according to the present invention for supplying power to power plants, cars, trucks, busses, cell phones, and laptops.

The invention is now further described by way of the following examples, which are, however, not meant to limit the scope of the present application.

EXAMPLES

EXAMPLE 1
(Preparation of MOF-5)

| Starting Material | Molar Amount | Calculated | Experimental |
| --- | --- | --- | --- |
| terephthalic acid | 12.3 mmol | 2.04 g | 2.04 g |
| zinc nitrate-tetra hydrate | 36.98 mmol | 9.67 g | 9.68 g |
| diethylformamide (Merck) | 2568.8 mmol | 282.2 g | 282.2 g |

The above-mentioned amounts of the starting materials were dissolved in a beaker in the order diethylformamide, terephthalic acid and zinc nitrate. The resulting solution was introduced into two autoclaves (250 ml), having respectively inner walls which were covered by teflon.

The crystallization occurred at 105° C. within twenty hours. Subsequently, the orange solvent was decanted from the yellow crystals, said crystals were again covered by 20 ml dimethylformamide, the latter being again decanted. This procedure was repeated three times. Subsequently, 20 ml chloroform were poured onto the solid, which was washed and decanted by said solvent two times.

The crystals (14.4 g), which were still moist, were introduced into a vacuum device and first at room temperature in vacuo ($10^{-4}$ mbar), afterwards dried at 120° C.

Figure 1:
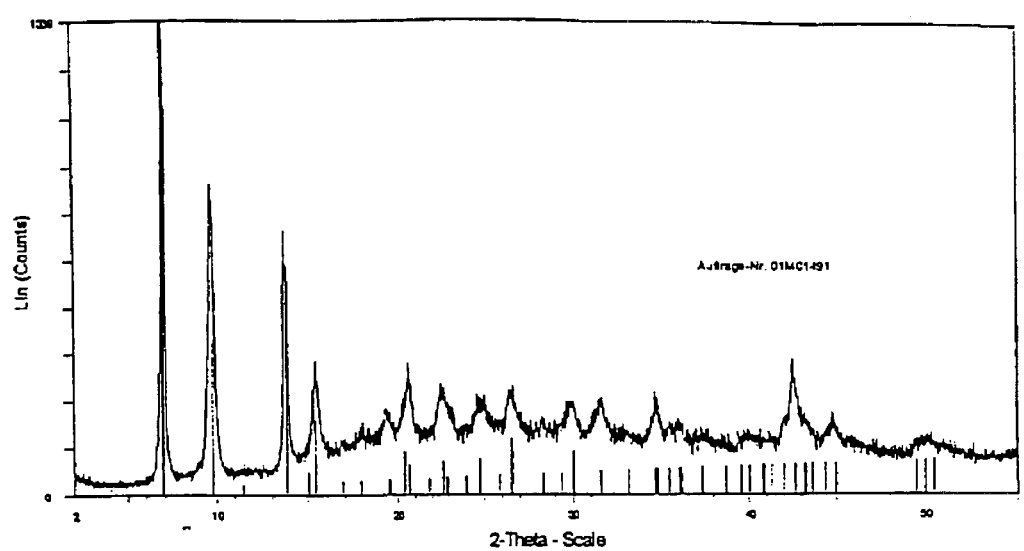
FIG. 1 shows a X-ray powder diffractogramm of the MOF-5 framework material as prepared according to Example 1.

Subsequently, the resulting product was characterized by X-ray powder diffraction and an adsorptive determination of micropores. The resulting product shows the X-ray diffractogramm according to FIG. 1, which coincides with MOF-5.

Figure 2:
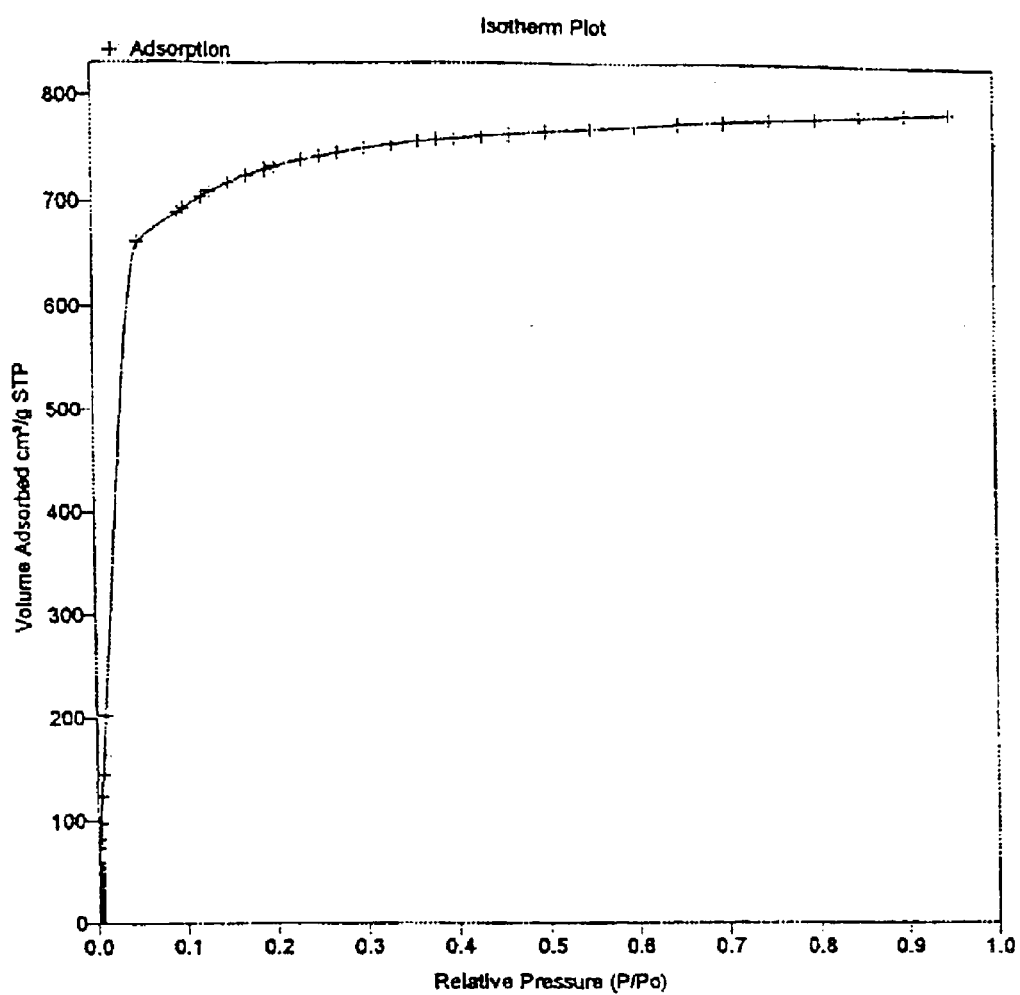
FIG. 2 shows the sorption isotherm of argon on MOF-5 at 87K.

The determination of the sorption isotherm, as depicted in FIG. 2, with argon (87K; Micromeritics ASAP 2010) shows an isotherm of type I, being typical for microporous materials, and having a specific surface area of 3020 m$^2$/g, calculated according to Langmuir, and a micropore volume of 0.97 ml/g (at a relative pressure $p/p^0$=0,4).

EXAMPLE 2

By using a magnetic suspension balance of the company Rubotherm Präzis-sionsmesstechnik GmbH, Bochum the storing capacity for hydrogen of the sample of Example 1 was determined as follows. The sample was weighed, introduced into the apparatus. After closing and evacuating the same to a pressure of $10^{-5}$ mbar by way of a membrane prepump and a turbo molecular pump the sample was heated under vacuum at 100° C. for 16 h.

Figure 3:
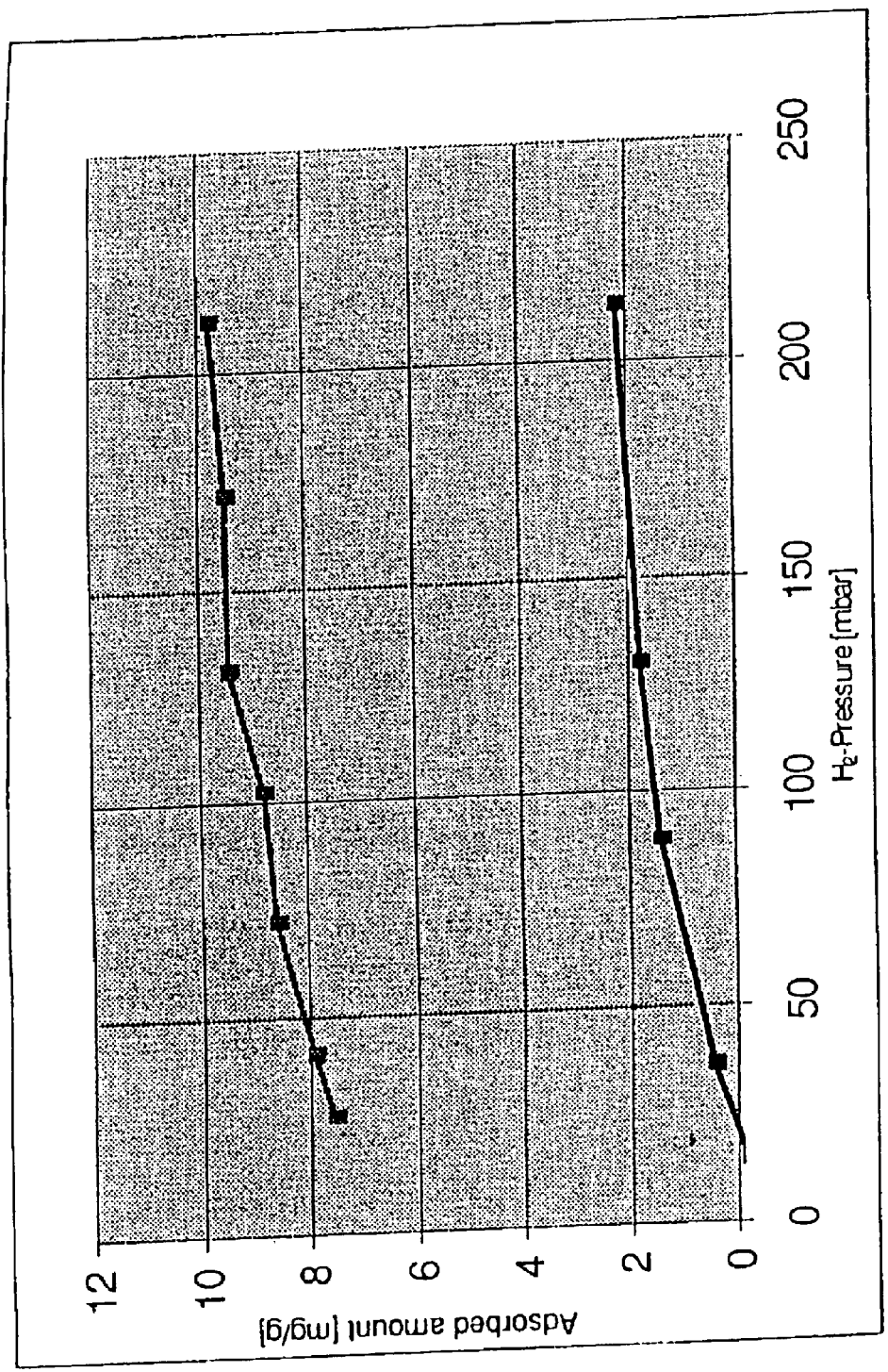
FIG. 3 shows the hydrogen sorption isotherm of hydrogen on MOF-5 at 30° C.

After thermostabilizing the sample at a temperature of 30° C., hydrogen (purity 99,999%; company Messer) was added at various pressures according to FIG. 3. The resulting sorption isotherm is shown in FIG. 3. This figure shows that at a hydrogen pressure of about 150 mbar the sample is capable of storing about 1wt.% hydrogen relative to the total weight of the activated sample. Under further increased pressure the storing capacity even increases.

EXAMPLE 3
(Comparative)

By using the same experimental setup and the same procedure as in Example 2 the storing capacity for hydrogen of activated carbon (company CECA, AC 40; specific surface area according to Langmuir 2037 m$^2$/g) was measured. FIG. 3 shows the significantly less capacity of activated carbon compared to MOF-5.

What is claimed is:

1. Method of uptaking, or storing, or releasing, or uptaking and storing, or uptaking and releasing, or storing and releasing or uptaking, storing and releasing at least one gas wherein the gas is uptaken, or stored, or released, or uptaken and stored, or uptaken and released, or stored and released or uptaken, stored and released by an agent comprising a metallo-organic framework material comprising pores and at least one metal ion and at least one at least bidentate organic compound, which is bound to said metal ion;

wherein the metallo organic framework material comprising pores exhibits a specific surface area, as determined via adsorption (BET according to DIN 66131) of larger than 2000 m$^2$/g.

2. Method according to claim 1, wherein the gas comprises at least one of the gases among the group consisting of hydrogen, nitrogen, a noble gas, CO, $CO_2$, and compounds generating and/or delivering these gases.

3. Method according to claim 2, wherein the gas is selected from the group consisting of hydrogen, a gas mixture comprising hydrogen, a hydrogen generating or delivering substance, a gas mixture comprising at least one hydrogen generating and/or delivering substance, and combinations thereof.

4. Method according to claim 1, wherein the metal ion is selected among ions of elements of groups Ia, IIa, IIIa, IVa to VIIIa and Ib to VIb of the periodic table of the elements.

5. Method according to claim 1, further comprising contacting the metallo-organic framework material with at least one capacity-enhancing agent selected from the group consisting of a solvent, a complex, a metal, a metal hydride, a metal alloy, and mixtures of two or more thereof.

6. Method according to claim 1, wherein the bidentate organic compound is selected among substituted or unsubstituted aromatic polycarboxylic acids, which may comprise one or more nuclei; and substituted or unsubstituted aromatic polycarboxylic acids, which comprise at least one hetero-atom and which may have one or more nuclei.

7. Device for uptaking, or storing, or releasing, or uptaking and storing, or uptaking and releasing, or storing and releasing, or uptaking, storing and releasing at least one gas, comprising a metallo-organic framework material, as claimed in claim 1.

8. Device according to claim 7, further comprising a container comprising the metallo-organic framework material; an entrance/exit opening for allowing the at least one gas to enter or exit the device; a gas-tight maintaining mechanism capable of maintaining the gas under pressure inside the container.

9. Fuel cell comprising the agent according to claim 1.

10. Method of using an agent comprising a metallo-organic framework material comprising pores and at least one metal ion and at least one at least bidentate organic compound, which is bound to said metal ions;

wherein said using comprises uptaking, or storing, or releasing, or uptaking and storing, or uptaking and releasing, or storing and releasing or uptaking, storing and releasing at least one gas in at least one of a stationary application, a mobile application, or a mobile portable application; and wherein the metallo organic framework material comprising pores exhibits a specific surface area, as determined via adsorption (BET according to DIN 66131) of larger than 2000 $m^2/g$.

11. Method of using according to claim 10, wherein at least one application is selected from the group consisting of a power plant, a car, a truck, a bus, a cell phone, a laptop, and combinations thereof.

12. Method of using a device according to claim 7, wherein said using comprises:

supplying power to an application selected from the group consisting of a power plant, a car, a truck, a bus, a cell phone, a laptop, and combinations thereof.

13. Method of using the fuel cell according to claim 9, wherein said using comprises:

supplying power to an application selected from the group consisting of a power plant, a car, a truck, a bus, a cell phone, a laptop, and combinations thereof.

14. The method according to claim 1, wherein at least one at least bidentate organic compound is coordinately bound to said metal ion.

15. The method of using according to claim 10, wherein at least one at least bidentate organic compound is coordinately bound to said metal ion.

\* \* \* \* \*